Patented Mar. 23, 1954

2,673,187

UNITED STATES PATENT OFFICE 2,673,187

BERYLLIA REGENERATION OF IRON-POISONED CRACKING CATALYSTS

Harrison M. Stine, Lyndhurst, Ohio, assignor to The Standard Oil Company, Cleveland, Ohio, a corporation of Ohio No Drawing. Application June 7, 1951, Serial No. 230,437

4 Claims. (Cl. 252—412)

The present invention relates to the treatment of aged, iron-poisoned hydrocarbon conversion catalysts such as cracking catalysts with beryllia to minimize the severity of their regneration, reduce the loss of fresh stock due to oxidation, to improve the activity of the catalysts after regeneration, and to increase the yield of converted products.

It is well known, for example, that in catalytic cracking operations the catalyst loses activity with age and becomes increasingly difficult to regenerate and that progressively increasing amounts of the fresh stock are lost due to oxidation when it first comes into contact with the regenerated catalyst.

In the fixed bed type of catalytic cracking unit, wherein the catalyst, usually of the silica-alumina type, remains in the reactor and is alternately subjected to an "on stream" of fresh stock to be cracked and an "off stream" of air for regeneration, as well as to purging and valve changes between the on and off streams, considerable difficulties are encountered in the various portions of the cycle.

During the cracking portion of the cycle, carbon from the hydrocarbon cracking stock is deposited upon the catalyst and sulfur, likewise from the stock, forms sulfides with the iron of the reactor or case. During the regeneration portion of the cycle, the air for regeneration converts the sulfide into an iron oxide. During the cycle of operations, the iron of the reactor, in being converted first to the sulfide and then to an oxide, flakes off the walls and is deposited on the catalyst. Iron oxide poisons the catalyst in the sense that it reduces its catalytic activity in the conversion of hydrocarbons.

Inasmuch as the iron oxide is itself an oxidation catalyst, it in turn catalyzes the oxidation of the carbon, usually referred to as the coke laydown, to favor the burning off to $CO_2$ instead of CO and thus raise the ratio of $CO_2$ to CO in the regeneration off gas with the release of greater heat of greater severity of regeneration. The burning of the coke laydown to $CO_2$ instead of CO is a tremendous disadvantage because the burning of carbon to carbon dioxide raises the temperature during regeneration much more than does the burning of carbon to carbon monoxide. The temperature developed imposes a considerable limitation on the regeneration step because there is an upper temperature limit that cannot be exceeded due to limitations imposed by the apparatus and control of the operation. When conditions exist that favor $CO_2$ formation, it is necessary to adjust the cracking operations so as to lay down less carbon if the maximum temperature during regeneration is not to be exceeded. Such adjustments will ordinarily result in loss of throughput or loss of conversion during cracking.

In the cracking portion of the cycle that follows, a part of the oil or fresh stock is burned by reduction of the iron oxide to an iron oxide of lower oxygen content. This loss of fresh stock, due to oxidation, is one of the greatest losses encountered in the catalytic cracking operation.

It has been found, for example, that the catalyst of a fixed bed cracking unit is very red when it is spent or used up. This is believed to indicate that iron is the biggest impurity in the spent catalyst and to account at least in part for the increasing severity of the regeneration or, if the severity of the regeneration is maintained constant, the decreasing catalytic activity of the catalyst. As the number of cycles carried out in a fixed bed cracking unit is increased, the maximum regeneration temperatures become greater even though the coke laydown in each cycle may be the same. The reason for this is that the amount and consequently the oxidation catalytic activity of the iron deposited on the catalyst increases with each cycle and therefore brings about increased carbon dioxide to carbon monoxide ratios in the regeneration off gas.

This increase of regeneration severity is one of the major reasons for periodically changing the catalyst in the plant operation of fixed bed catalytic cracking units. Such a change is, of course, undesirable not only from a standpoint of the amount of catalytic material required but also from the point of view that during the change, which involves cooling of the unit, removal of the spent catalyst, introduction of the new catalyst and reheating of the unit, the reactor is unproductive and therefore adds to the overhead. This is an involved operation. It requires several months to change the catalyst in a commercial plant.

In addition to these regeneration difficulties, as much as 2 to 3% of the feed stock is lost at the start of the on stream period due to the reduction of the iron oxide in the catalyst. This is often one of the greatest and most serious losses of stock in a refinery.

In the continuous cracking processes, the catalytic reaction is carried out continuously in the reactor and the catalyst is passed through the reactor, after which it is withdrawn and fed to a regenerator, and the regenerated catalyst is reintroduced into the reactor. Although in this type of operation iron sulfide is formed on the walls of the reactor to produce a more or less permanent coating or film that will prevent excessive corrosion of the reactor walls, the process is nevertheless made difficult because some iron is deposited on the catalyst while it passes through the reactor and thus brings about the high regeneration temperatures due to the burning of the coke laydown to carbon dioxide instead of carbon monoxide, and to a more or less extent all the other disadvantages mentioned above. The problem is not so acute in the continuous process as it is in the fixed bed, but to the extent that it is present in the continuous process, the invention is equally applicable thereto.

It has now been found that by the treatment of aged, iron-poisoned hydrocarbon conversion catalysts such as cracking catalysts, with beryllia, the severity of the regeneration can be brought to a minimum, the loss of fresh stock due to oxidation is reduced, the activity of the catalyst is improved, and the yield of converted products is materially increased.

The method of this invention is to be distinguished from prior art methods that have hitherto been proposed for treating fresh catalysts with beryllia or reactivating spent catalysts with other compounds of beryllium. Prior art methods of treating fresh catalysts with beryllia, while possibly resulting in a slightly higher catalytic activity on the part of the catalyst, have no measurable effect on the iron oxide later deposited on the catalyst. Such methods are, therefore, ineffective in avoiding the deleterious effects produced by iron oxide deposited on the catalyst in the course of the cracking cycle. The only prior art method known to applicant wherein spent catalyst is treated with a beryllium compound is one wherein the spent catalyst is first soaked for an extended period of time in an alkali metal hydroxide or silicate solution and then treated with a solution of beryllium nitrate. In this method, the alkali metal enters the molecular structure of the catalyst and is subsequently replaced by beryllium in a base exchange operation. There is believed to be no indication in the prior art that this method has any inhibiting effect whatever on the deleterious action of iron oxide deposited on the catalyst.

While it is to be understood that the scope of the present invention is not to be limited by any theory suggested herein, it is believed that the treatment of an aged, iron-poisoned catalyst with beryllia according to the method of this invention results in a reaction of the beryllia with the iron oxide to form a spinel, $BeFe_2O_4$, having little or no oxidative activity. This is believed to be responsible, for example, for the fact that during the regeneration of a beryllia-treated, aged catalyst, the burning off of the coke laydown will not be so strongly catalyzed by the iron oxide and consequently the ratio of carbon dioxide to carbon monoxide in the off gases, and therefore the temperature of the regeneration, will be kept to a minimum.

The beryllia treatment has a highly desirable effect upon the iron that is deposited upon the catalyst in that the loss of fresh stock due to oxidation in the initial portions of the cracking cycle are considerably reduced. This is important since the starting stock, which is burned to carbon oxides, is completely lost and, to the extent that this can be minimized, it improves the recovery of valuable products.

The amount of iron on the aged catalyst varies with the length of use of the catalyst and the type and condition of the equipment. Generally, the catalyst will contain at least 0.15% $Fe_2O_3$ before treatment in accordance with the invention.

The aged catalyst may be treated with beryllia in any suitable manner. It has been found, for example, that excellent results are obtained by soaking or impregnating the aged, iron-poisoned catalyst with an aqueous solution of beryllium nitrate and then heating the soaked catalyst to convert the nitrate to beryllia. Due to the fact that beryllia is a highly refractive, insoluble oxide that is stable to steam, it is also feasible to treat the aged catalyst by subjecting it to steaming with beryllia-containing steam.

The amount of beryllia that is required to effectively poison the iron oxide deposited on the catalyst and achieve the beneficial results of the invention is surprisingly small. Thus, for example, the deposition of beryllia in an amount as little as about 0.2% by weight of the catalyst has been found to be ample, as evidenced by an increase in catalytic activity and by the ratio of $CO_2$ to $CO$ formed in the regeneration, to produce the results desired.

Although the description of the invention herein is specific to treatment with beryllia and beryllium nitrate followed by conversion of the nitrate to beryllia, it is to be understood that aged catalysts may also be treated with other beryllium compounds capable of being converted to beryllia, such as, for example, by the introduction of a volatile beryllium compound with steam, followed by hydrolysis to the oxide with steam.

It is also to be understood that the treatment of this invention may be applied, with excellent results, to any aged catalysts that are normally capable of being regenerated by burning off coke to form appreciable amounts of CO and particularly to aged catalysts that tend to lose activity and effectiveness when contaminated with iron. Examples of such catalysts are those containing or composed of silica, alumina, magnesia, zirconia, and clay. Furthermore, the treatment of this invention is effective with such catalysts whether they be naturally occurring or synthetically made.

The amount of the beryllium compound applied to the catalyst preferably is based on the iron content of the catalyst and the amount should be such as to convert the iron to the spinel above referred to. The amount may vary from plus or minus 50 per cent of the preferred amount with advantageous results.

The primary advantages of the present invention lie in the extreme simplicity of operation and the many beneficial results obtained thereby. Among the latter are the increased catalytic activity of the regenerated catalyst, the accompanying increase in the yield of cracked products, the reduction in the loss of fresh stock due to oxidation, and reduction in the severity of the regeneration.

Another advantage of the invention is that beryllium is non-corrosive and does not poison the cracking catalysts that are conventionally used in cracking operation.

These and other advantages as well as the utility and objects of the invention will become more apparent from the following examples which are illustrative only and are not intended to limit the scope of the invention.

EXAMPLE 1

An aged or used Houdry catalyst contaminated with 1% by weight of ferric oxide was impregnated with a dilute solution of beryllium nitrate, the solution having been prepared by diluting a commercially available aqueous solution of beryllium nitrate (containing an amount of the latter equal to 5% BeO) with 14 parts by volume of water to one part by volume of solution. About 6½ parts by weight of the dilute solution were then poured onto 10 parts by weight of the aged catalyst. The solution was soaked up by the catalyst as water would be by a sponge. The soaked pellets, which were still porable, were then heated to 900° F. for ten hours, whereby the beryllium nitrate was converted to beryllia.

The pellets thereupon contained approximately 0.22% by weight of beryllia.

A sample of the catalyst thus treated, a sample of the same iron-poisoned catalyst not treated with beryllia and a sample of unpoisoned catalyst were each subjected to a treatment to determine the activity of the various samples of catalyst for the reaction $$2CO + O_2 \rightleftharpoons 2CO_2$$

Each test consisted in passing carbon monoxide and an excess of oxygen over the catalyst sample and absorbing the carbon dioxide formed with "Ascarite," a sodium hydroxide-asbestos absorbent. The remaining carbon monoxide was completely oxidized over a cupric oxide catalyst, the carbon dioxide being likewise absorbed with "Ascarite." The temperature required to give a 15% conversion was selected as a basis for comparison.

The results of these tests are tabulated below in Table 1:

Table 1

| Catalyst | Temperature (°F.) Required to Convert 15% CO to CO₂ |
| --- | --- |
| Beryllia-regenerated | 885 |
| Poisoned, unregenerated | 675 |
| Unpoisoned | 950 |

The foregoing data indicates that the oxidative activity of the iron oxide was successfully inhibited by the beryllia treatment.

EXAMPLE 2

A sample of plant-aged Houdry catalyst containing about 0.3% iron was treated with beryllia in the manner described in Example 1. The beryllia treated sample was then compared with a similar untreated sample in standard catalyst activity tests.

The results of these tests are tabulated below in Table 2:

Table 2

| | Aged, Untreated Catalyst | Aged, Beryllia-treated Catalyst |
| --- | --- | --- |
| Gas, wt. percent | 4.13 | 3.50 |
| Liquid products, wt. percent | 89.55 | 92.30 |
| Acid gas, wt. percent | 0.097 | 0.018 |
| Carbon, wt. percent | 1.73 | 1.57 |
| CO₂/CO | 2.85 | 2.00 |
| Activity Index | 28.5 | 25.8 |

The lower CO₂/CO ratio and the lower acid gas in these tests by the aged beryllia treated catalyst indicates that the oxidative action of the iron oxide had been satisfactorily inhibited.

EXAMPLE 3

One sample of fresh Houdry catalyst was impregnated with 0.4% beryllia in substantially the manner described in Example 1, heated for 30 hours at 1000° F., then impregnated with 0.5% iron and then heated for an additional 10 hours at 1000° F. Another sample of fresh Houdry catalyst was impregnated with 0.5% iron, without prior impregnation with beryllia, and heated 40 hours at 1000° F. The heat treatments of these samples were used to synthetically age these catalyst samples. The two samples thus prepared were then subjected to the standard catalytic activity test.

The results are tabulated below in Table 3:

Table 3

| | Catalyst treated with Be, then with Fe | Catalyst Impregnated with Fe |
| --- | --- | --- |
| Gas, wt. percent | 5.63 | 7.00 |
| Carbon, wt. percent | 5.27 | 5.85 |
| Liquid product, wt. percent | 84.0 | 83.2 |
| Acid gas, wt. percent | 0.136 | 0.020 |
| CO₂/CO | 5.50 | 3.10 |
| Activity index | 21.5 | 23.1 |

These tests show that the oxidative effects of the iron are not effectively inhibited by beryllia when the beryllia is incorporated into the catalyst during manufacture.

It is to be understood that the method herein described may be modified considerably without departing from the invention and that applicant is not to be limited to any theory advanced herein.

I claim:

1. A method which consists essentially of applying to an untreated, aged, iron-poisoned silica-alumina cracking catalyst a fraction of a per cent by weight of beryllia.

2. A method which comprises impregnating an untreated age, iron-poisoned silica-alumina cracking catalyst with a dilute aqueous solution of beryllium nitrate and then heating the impregnated catalyst to convert the beryllium nitrate into beryllia.

3. In a method of regenerating an aged, iron-poisoned silica-alumina cracking catalyst, the step which consists essentially of applying to the catalyst a fraction of a per cent by weight of beryllia.

4. In a method of regenerating an untreated aged, iron-poisoned silica-alumina cracking catalyst, the steps which comprise impregnating the catalyst with a dilute aqueous solution of beryllium nitrate and then heating the impregnated catalyst to convert the beryllium nitrate into beryllia.

HARRISON M. STINE.

References Cited in the file of this patent
UNITED STATES PATENTS

| Number | Name | Date |
| --- | --- | --- |
| 2,480,627 | Bodkin et al. | Aug. 30, 1949 |
| 2,580,004 | Cornell | Dec. 25, 1951 |